April 27, 1954
R. C. HOKE
2,676,406
PARING KNIFE
Filed Dec. 16, 1952
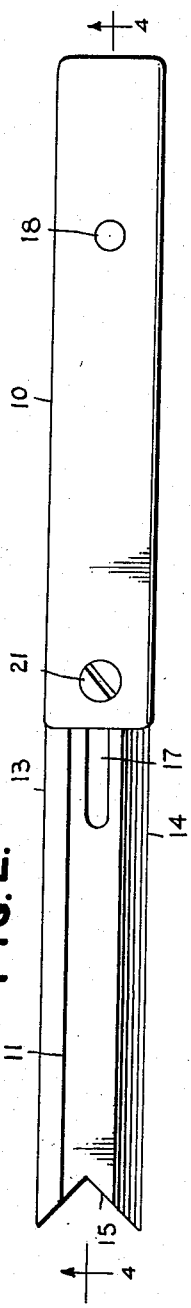
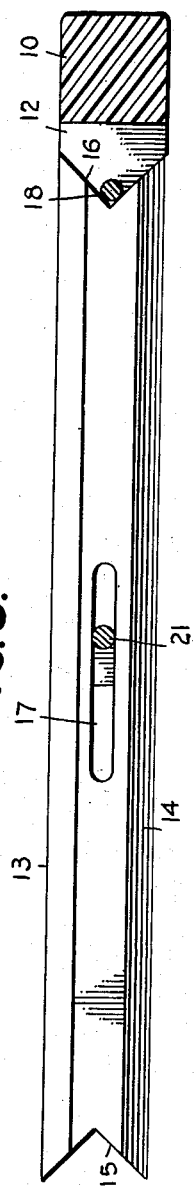
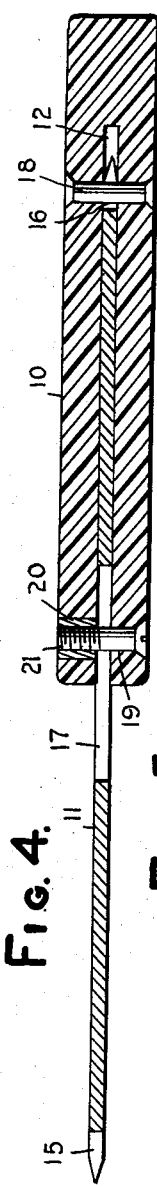
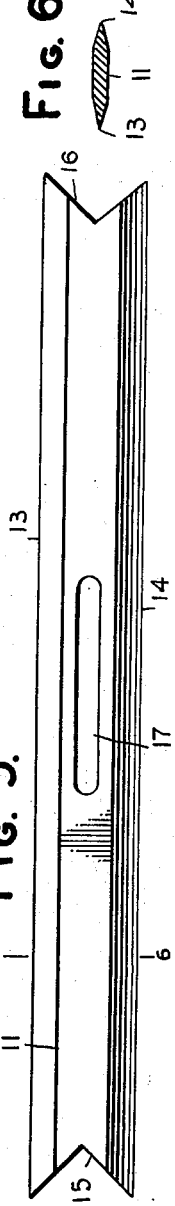
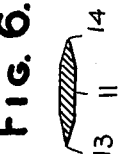
INVENTOR
RUSSELL C. HOKE
BY
McMorrow, Berman & Davidson
ATTORNEY Patented Apr. 27, 1954

2,676,406

UNITED STATES PATENT OFFICE 2,676,406

PARING KNIFE

Russell C. Hoke, Huntington, W. Va.

Application December 16, 1952, Serial No. 326,266

3 Claims. (Cl. 30—320)

This invention relates to hand knives, such as paring knives, and more particularly to a knife having a handle and a changeable and replaceable blade so that a sharp edged blade can be maintained in the handle at all times without the necessity of sharpening the blade.

It is among the objects of the invention to provide a knife having an handle provided with a blade receiving slot and a blade detachably mounted in the handle in a manner such that the blade can be turned end for end in the handle to bring sharp edges of the blade to operative position; in which the blade has a length double the length of the portion in use at any time and has its longitudinal edges sharpened throughout their length; in which the blade is economical to manufacture and dispensable, being replaced by a new blade when all of its cutting edges have been dulled; in which the blade can be easily turned end for end in the handle and removed from the handle and replaced when necessary; and which is simple and durable in construction, economical to manufacture and neat and attractive in appearance.

Other objects and advantages will become apparent from a consideration of the following description and the appended claims in conjunction with the accompanying drawing wherein:

Figure 1 is a top plan view of a knife illustrative of the invention;

Figure 2 is a side elevational view of the knife illustrated in Figure 1;

Figure 3 is a longitudinal cross sectional view on the line 3—3 of Figure 1;

Figure 4 is a longitudinal cross sectional view on the line 4—4 of Figure 2;

Figure 5 is a slide elevational view of the blade; and

Figure 6 is a cross sectional view on the line 6—6 of Figure 5.

With continued reference to the drawing, the knife blade comprises an elongated handle 10 which is illustrated as of substantially rectangular cross sectional shape and having a length somewhat greater than one half the length of the associated blade 11. The handle is provided with a slot 12 extending transversely and longitudinally thereof medially of the thickness of the handle and opening to one end of the handle, this slot terminating at its inner end at a location spaced from the other end of the handle.

The blade 11 is of elongated, substantially rectangular shape with straight and substantially parallel side edges 13 and 14 which are bevelled and sharpened throughout their length to provide cutting edges extending one along each side of the blade. The blade has a width slightly less than the width of the handle 10 and a thickness substantially equal to the thickness of the slot 12 in the handle. It is provided in its opposite ends with V-shaped notches 15 and 16 and is provided medially of its width with a longitudinally extending closed slot 17 which extends to opposite sides of the mid length location of the blade.

A pin or rivet 18 extends transversely through the handle 10 and through the slot 12 in the handle near the inner end of the slot and an aperture 19 extends transversely through the handle and the slot 12 medially of the width of the handle and near the end of the handle to which the slot 12 opens. An internally screw threaded sleeve 20 is secured in the aperture 19 at one side of the slot 12 and constitutes a nut fixed in the adjacent portion of the handle and a clamp screw 21 extends through the portion of the handle at the opposite side of the slot and is threaded into the sleeve 20 to clamp the portions of the handle at the respectively opposite sides of the slot 12 and at the end of the handle to which the slot opens against the correspondingly opposite sides of a blade 11 received in the handle slot.

The blade 11 has approximately one half of its length disposed in the slot 12 in the handle with the notch in the end of the blade received in the handle slot receiving the abutment pin 18 near the inner end of the slot and with the clamping screw 21 extending through the slot 17 in the blade and clamping the portions of the handle at the opposite sides of the slot 12 against the opposite sides of the blade adjacent the closed slot 17 in the blade. The other half of the blade projects longitudinally from the end of the handle to which the slot 12 opens and provides cutting edges one along each longitudinal edge thereof.

When both of the cutting edges on the portion of the blade extending out of the handle have been dulled, the clamp screw 21 can be loosened and the blade pulled outwardly of the handle until the abutment pin 18 is clear of the notch in the adjacent end of the blade. The blade can then be turned about the screw 21 until the portion thereof having the dulled cutting edges is disposed in the handle slot and the portion previously disposed in the slot extends longitudinally from the handle. The blade is then pushed back into the handle until the abutment pin 18 is received in the notch in the end of the blade now disposed in the handle slot and the clamp screw 21 is tightened to secure the blade firmly in operative position in the handle with undulled portions of its cutting edges extending longitudinally from the end of the handle to which the slot 12 opens.

When it is desired to replace an old blade with a new blade, the clamp screw 21 is removed entirely from the handle, the old blade pulled out of the handle slot 12 and one end portion of a new blade inserted in the handle slot until the abutment pin 18 is engaged in the notch in the end of the new blade disposed within the handle slot and the clamp screw 21 is then replaced and tightened to firmly secure the new blade in the handle.

The handle can be formed of any suitable material, such as wood, synthetic resin plastic, hard rubber or metal, and the blade is formed of a suitable material, such as steel, on which a cutting edge can be provided. The blade is of simplified form and a plurality of blades can be economically manufactured from a strip of steel, the edges of which are bevelled and sharpened and which is subsequently cut into suitable lengths to provide the blades 11, the notches in the ends of the blades being provided when the blades are cut from the strip. This provides an economical manner of manufacturing the blades so that the blades are of nominal cost and can be discarded and replaced by new blades when their cutting edges have been dulled and there will be no necessity for resharpening the cutting edges of a blade.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A hand knife comprising a handle having a transversely and longitudinally extending slot medially of the thickness thereof and opening to one end of the handle and terminating at a location spaced from the other end of said handle, an elongated blade having its longitudinal edges sharpened and having a notch in each end thereof and a longitudinally extending slot extending to opposite sides of its midlength location, substantially one half of the length of said blade being received in the slot in said handle, abutment means comprising a pin adjacent said other end of said handle extending transversely through the slot in said handle and engaged in the notch in the end of the blade disposed within said handle slot, and means extending through the slot in said handle and the slot in said blade clamping said blade in position in said handle.

2. A hand knife comprising an elongated handle having a transversely and longitudinally extending slot disposed medially of the thickness thereof and opening to one end of the handle and terminating at a location spaced from the other end of said handle, a blade of elongated substantially rectangular shape having it longitudinal edges sharpened and having a notch in each end thereof and a longitudinally extending slot extending to opposite sides of its midlength location medially of the width thereof, the slot in said handle having a length somewhat greater than one half of the length of said blade and substantially one longitudinal half of said blade being received in the slot in said handle, abutment means comprising a pin adjacent said other end of said handle extending transversely through the slot in said handle and engaged in the notch in the end of the blade disposed within said handle slot, and a clamping screw extending through the slot in said handle near the end of said handle to which the handle slot opens and through the slot in said blade and clamping the portions of said handle at the respectively opposite sides of said blade against said blade to hold the blade in position in the handle.

3. A hand knife comprising a handle and an elongated blade having its longitudinal edges sharpened throughout their length, a transversely and longitudinally extending slot in said handle medially the thickness thereof opening to one end of the handle and terminating at a location spaced from the other end of the handle, an abutment pin extending transversely through said handle and said slot adjacent the other end of the handle, V-shaped notches at either end of said blade, a longitudinally extending slot closed at both ends in said blade medially its width and extending to opposite sides of the midlength location of said blade, approximately one-half of the length of said blade being adapted to be received in the slot in said handle and said notch in the blade end engaging said abutment pin, and clamping means comprising an internally threaded sleeve and a clamp screw threadingly received therein carried by said handle adjacent the end of said handle to which the handle slot opens and pressing the sides of said handle at opposite sides of said blade against the blade to secure the blade firmly in the handle.

References Cited in the file of this patent

UNITED STATES PATENTS

| Number | Name | Date |
|---|---|---|
| 249,101 | Sawtell | Nov. 1, 1881 |
| 939,846 | Matthews | Nov. 9, 1909 |
| 1,876,180 | Tobin | Sept. 6, 1932 |
| 1,903,789 | Michaels | Apr. 18, 1933 |
| 1,940,270 | Rainwater | Dec. 19, 1933 |
| 2,291,128 | Yarrow | July 28, 1942 |
| 2,329,833 | Gardella et al. | Sept. 21, 1943 |